United States Patent
Chuang

(10) Patent No.: US 8,267,418 B1
(45) Date of Patent: Sep. 18, 2012

(54) CAP OF BICYCLE HEADSET WITH EASY ADJUSTABLE MOUNTING BRACKET

(76) Inventor: Louis Chuang, Taichung (TW)

(*) Notice: Subject to any disclaimer, the term of this patent is extended or adjusted under 35 U.S.C. 154(b) by 0 days.

(21) Appl. No.: 13/277,320

(22) Filed: Oct. 20, 2011

(30) Foreign Application Priority Data

Aug. 30, 2011 (TW) .............................. 100131075 A

(51) Int. Cl.
*B62K 19/30* (2006.01)
(52) U.S. Cl. ...................................... 280/279; 280/288.4
(58) Field of Classification Search ................... 280/279, 280/280, 276, 288.4; D12/114, 111; 74/551.1, 74/551.8, 551.9
See application file for complete search history.

(56) References Cited

U.S. PATENT DOCUMENTS

| | | | | |
|---|---|---|---|---|
| 5,331,864 | A * | 7/1994 | Chi | 74/551.1 |
| 5,782,479 | A * | 7/1998 | Adams et al. | 280/279 |
| 6,523,847 | B1 * | 2/2003 | Chien | 280/279 |
| 7,703,786 | B1 * | 4/2010 | Domahidy et al. | 280/280 |
| 2005/0092127 | A1 * | 5/2005 | Chiang | 74/551.8 |
| 2006/0055146 | A1 * | 3/2006 | Ueno | 280/280 |
| 2011/0140391 | A1 * | 6/2011 | Lane | 280/279 |

* cited by examiner

*Primary Examiner* — Tashiana Adams
(74) *Attorney, Agent, or Firm* — Alan Kamrath; Kamrath IP Lawfirm, PA

(57) ABSTRACT

A cap of a bicycle headset with an easy adjustable mounting bracket includes a cap, a mounting bracket, a fastener, and a joining structure. The bicycle headset engaged in a steer tube includes the fastener positionable between a first engaging position in which the cap is rotatable about the fastener and the pivot is not tightly disposed in the recess and the bracket is pivotal to various pivoting positions with respect to the cap and a second engaging position in which the cap is fixedly positioned on the steer tube and the pivot is not tightly disposed in the recess and the bracket is fixedly positioned at one of the pivoting positions.

12 Claims, 7 Drawing Sheets

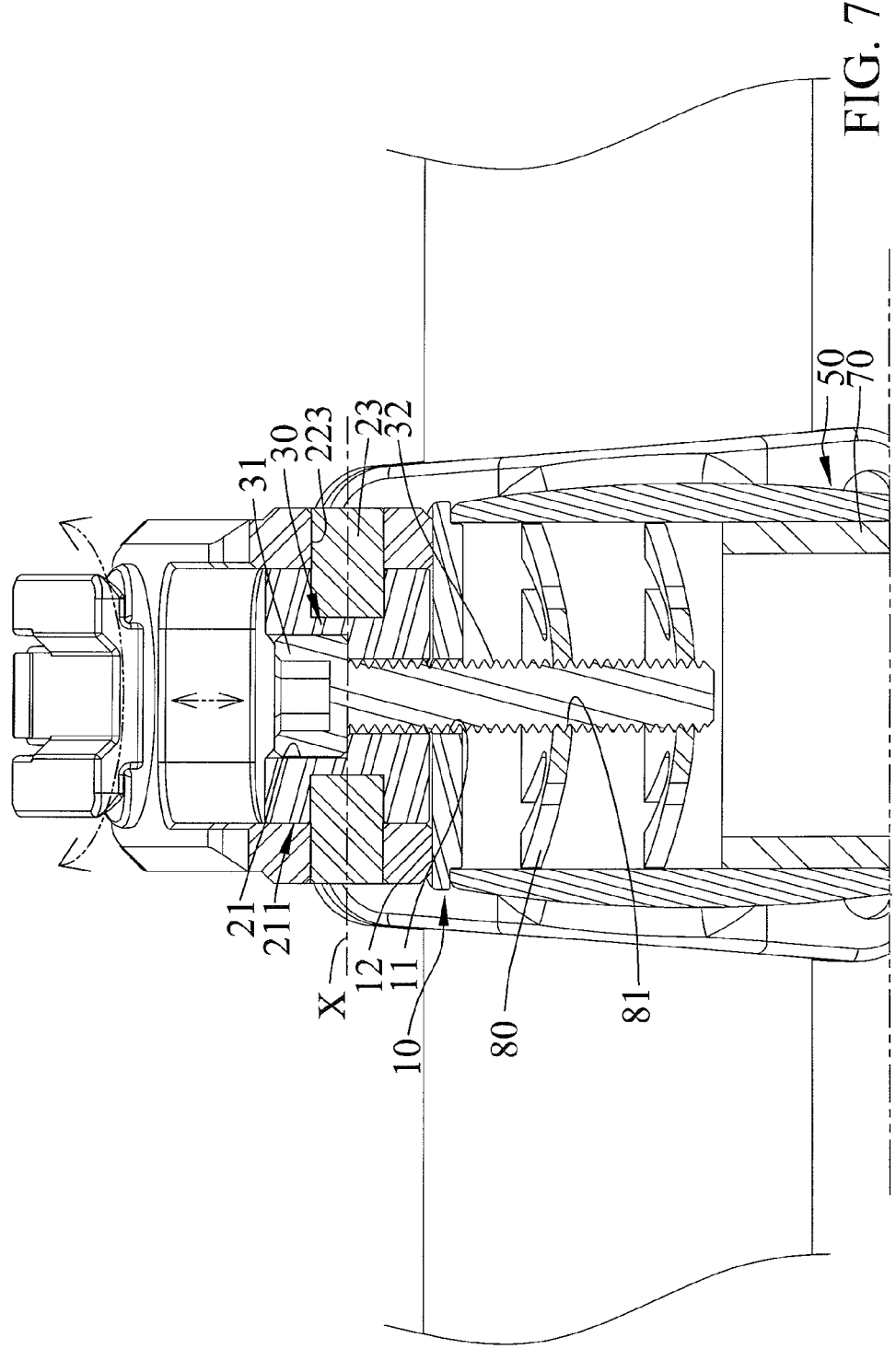

CAP OF BICYCLE HEADSET WITH EASY ADJUSTABLE MOUNTING BRACKET

BACKGROUND OF THE INVENTION

1. Field of the Invention

The present invention relates to a cap of a bicycle headset and, particularly to, a cap with an easy adjustable mounting bracket.

2. Description of the Related Art

FIGS. 1 and 2 show a conventional cap of a bicycle headset with a mounting bracket including a cap 1, a fastener 2, a mounting bracket 3, and a fixing member 4. The bicycle headset is installed in a steer tube 7. The bicycle headset includes a star nut 8 disposed in the steer tube 7. The steer tube 7 has an open end covered by the cap 1. The star nut 8 is concealed by the cap 1. The cap 1 is secured to the star nut 8 by the fastener 2. The cap 1 has a hole 101 and the star nut 8 has a hole 801 extended therein respectively. The fastener 2 is inserted through the hole 101 to engage with the star nut 8, then the fastener 2 is inserted into and engaged the hole 801 in order to allow the cap 1 to be fixed engaged with the steer tube 7. Moreover, the fastener 2 is adapted to be moved to an engaging position in which the cap 1 is able to be rotated about the fastener 2. The mounting bracket 3 is pivotally and adjustably engaged with the cap 1 by the fixing member 4. The cap 1 includes an orifice 102 and the mounting bracket 3 includes an orifice 301 respectively. The fixing member 4 is inserted through the orifice 301, then the fixing member 4 is inserted into and engaged the hole 102 in order to allow the mounting bracket 3 to join to the cap 1. The fixing member 4 is movable to a first engaging position in that the mounting bracket 3 is fixedly positioned at a pivoting position with respect to the cap 1 and a second engaging position in that the mounting bracket 3 is pivotal with respect to the cap 1 about the fixing member 4. The mounting bracket 3 is used for engaging an accessory. The mounting bracket 3 defines a connecting end 302 for engaging with the accessory.

FIGS. 1 and 2 also show the steer tube 7 includes a stem 5 engaged therewith. The stem 5 defines a mounting end 501 engaged with the steer tube 7. The stem 5 engaged with the steer tube 7 includes the mounting end 501 including an inner periphery circumscribing an outer periphery of the steer tube 7. The inner periphery of the mounting end 501 is not enclosed and extend laterally form a first end to a second end and includes the first and second end separated by a gap 502. Additionally, a handle bar 6 is installed to the stem 5.

The fastener 2 can be moved to the engaging position in which the cap 1 can be rotated and the fixing member 4 can be moved to the second engaging position in which the mounting bracket 3 can be pivoted with respect to the cap 1. Accordingly, the mounting bracket 3 is positionable to various orientations and various pivoting positions. Nevertheless, adjustments of the fastener 2 and the fixing member 4 are time-consuming and laborious.

The present invention is, therefore, intended to obviate or at least alleviate the problems encountered in the prior art.

SUMMARY OF THE INVENTION

According to the present invention, a cap of a bicycle headset with an easy adjustable mounting bracket includes a cap, a mounting bracket, a fastener, and a joining structure. The cap includes a hole and a recess. The mounting bracket is used for engaging with an accessory. The mounting bracket is pivotally engaged with the cap. The mounting bracket includes a pivot and a bracket. The pivot is disposed in the recess of the cap. The pivot includes an orifice. The bracket is pivotally engaged with the pivot and pivotal about the pivot. The fastener is inserted into the orifice and the hole and engagable with a star nut of the bicycle headset. The joining structure is disposed on the bracket. The joining structure provides a joining end with which the accessory is engagable.

The bicycle headset engaged in a steer tube includes the fastener positionable between a first engaging position in which the cap is rotatable about the fastener and the pivot is not tightly disposed in the recess and the bracket is pivotal to various pivoting positions with respect to the cap and a second engaging position in which the cap is fixedly positioned on the steer tube and the pivot is not tightly disposed in the recess and the bracket is fixedly positioned at one of the pivoting positions.

It is an objective of the present invention to provide a cap of a bicycle headset including a mounting bracket used for engaging with an accessory.

It is another objective of the present invention to provide a cap of a bicycle headset including a mounting bracket adapted to be positioned at various adjusting positions and to be easily adjusted.

It is a further objective of the present invention to provide a cap of a bicycle headset with a mounting bracket including a fastener that can make the bicycle headset engaged with a steer tube includes the cap fixedly positioned on the steer tube and retain the mounting bracket at a fixed adjusting position concurrently.

Other objects, advantages, and new features of the present invention will become apparent from the following detailed description of the invention when considered in conjunction with the accompanied drawings.

BRIEF DESCRIPTION OF THE DRAWINGS

FIG. 2 is an exploded perspective view of the conventional cap of

FIG. 7 is a cross-sectional view of the cap of FIG. 3 and shows the mounting bracket at a position that is fixedly positioned.

DETAILED DESCRIPTION OF THE PREFERRED EMBODIMENT

Figure 1:
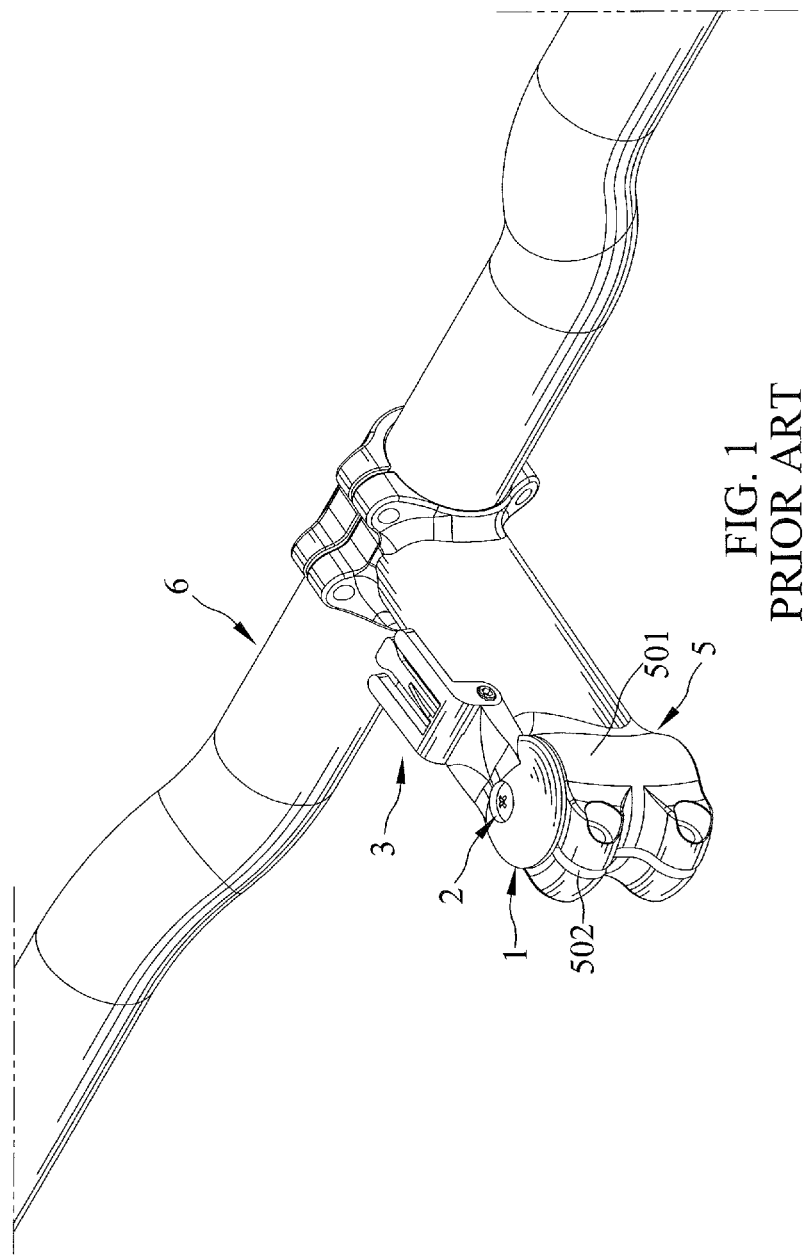
FIG. 1 is a perspective view of a conventional cap of a bicycle headset with a mounting bracket.
Figure 2:
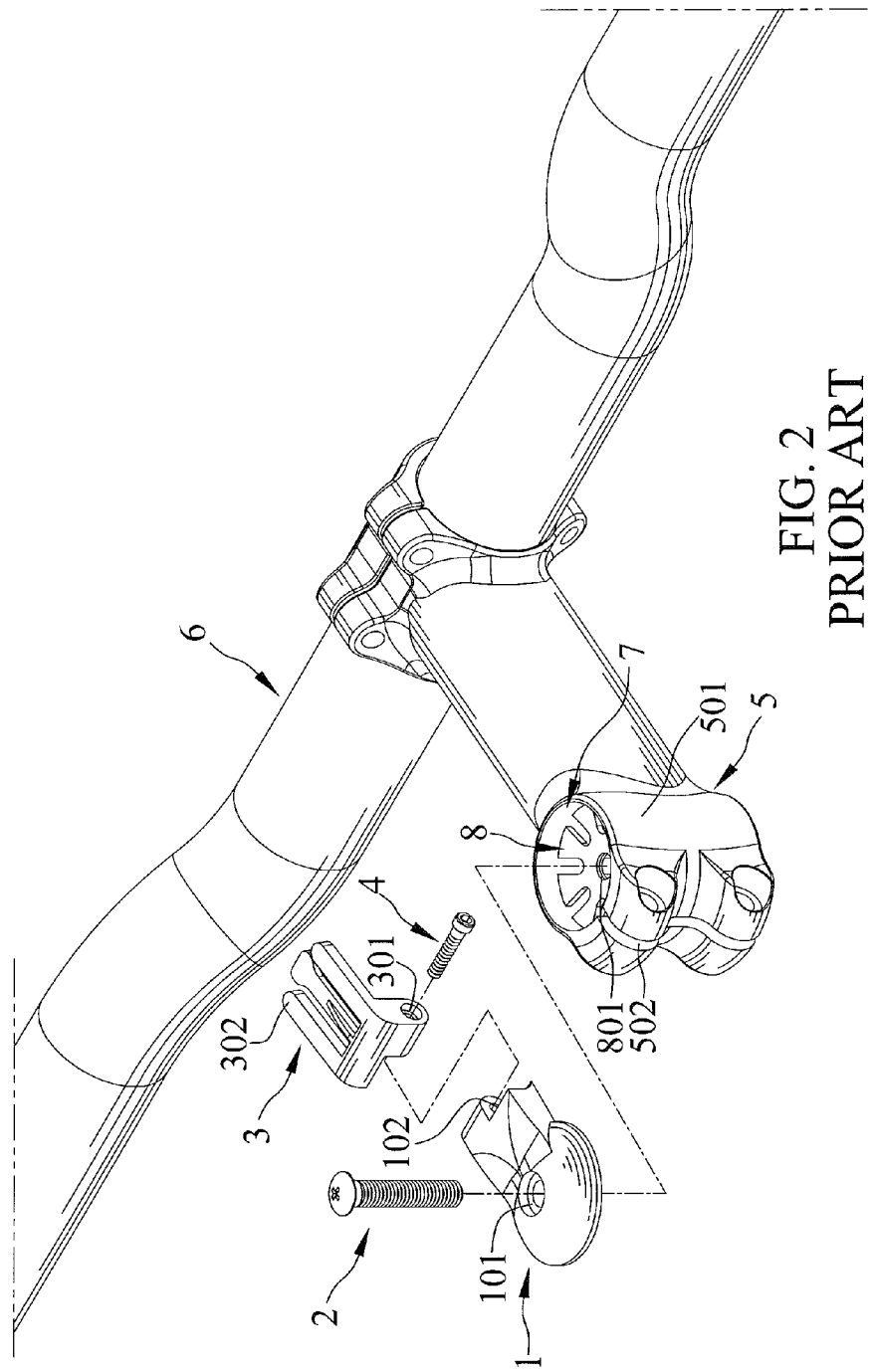
Figure 3:
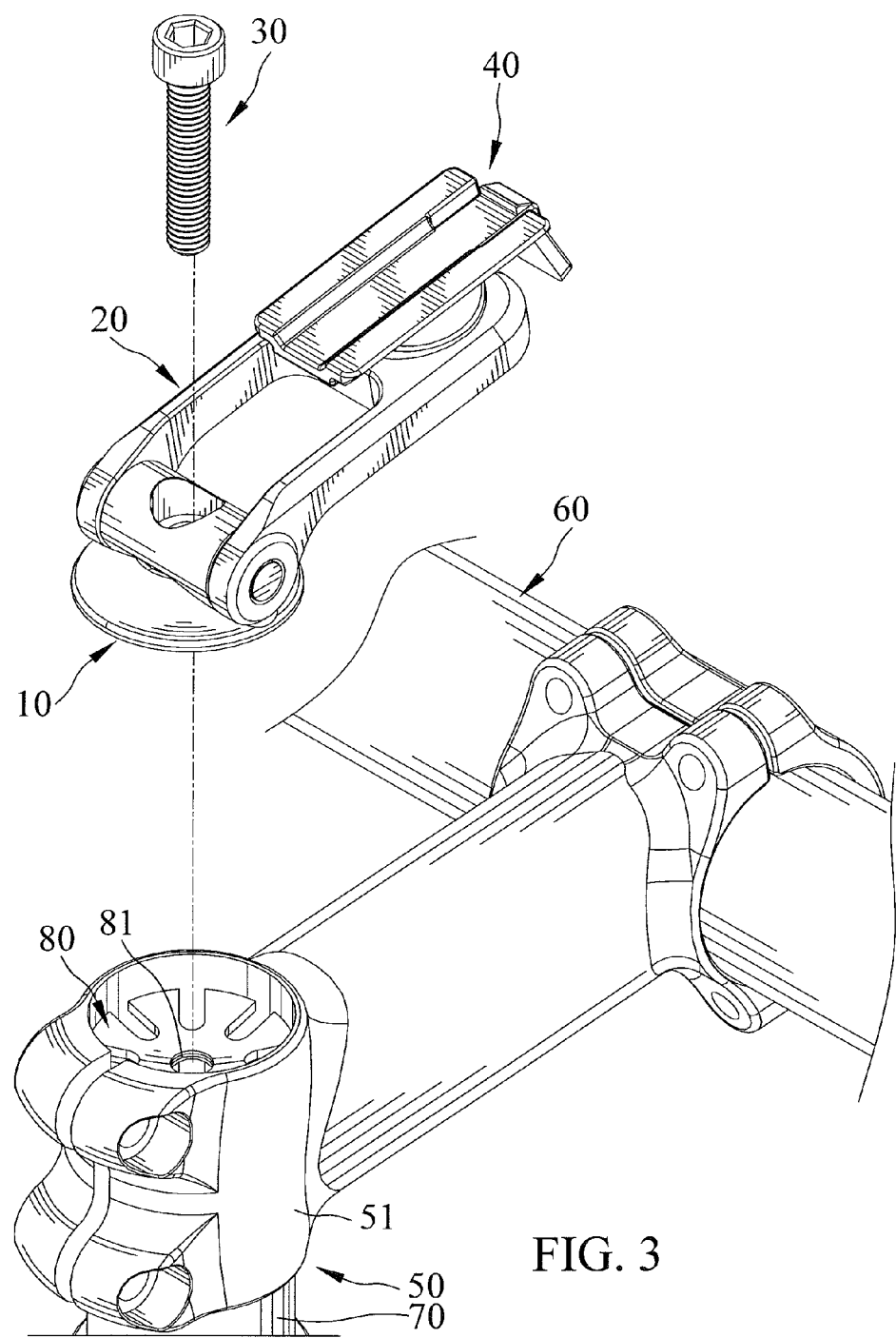
FIG. 3 is a perspective view showing the installation of a cap of a bicycle headset with an easy adjustable mounting bracket in accordance with the present invention.
Figure 4:
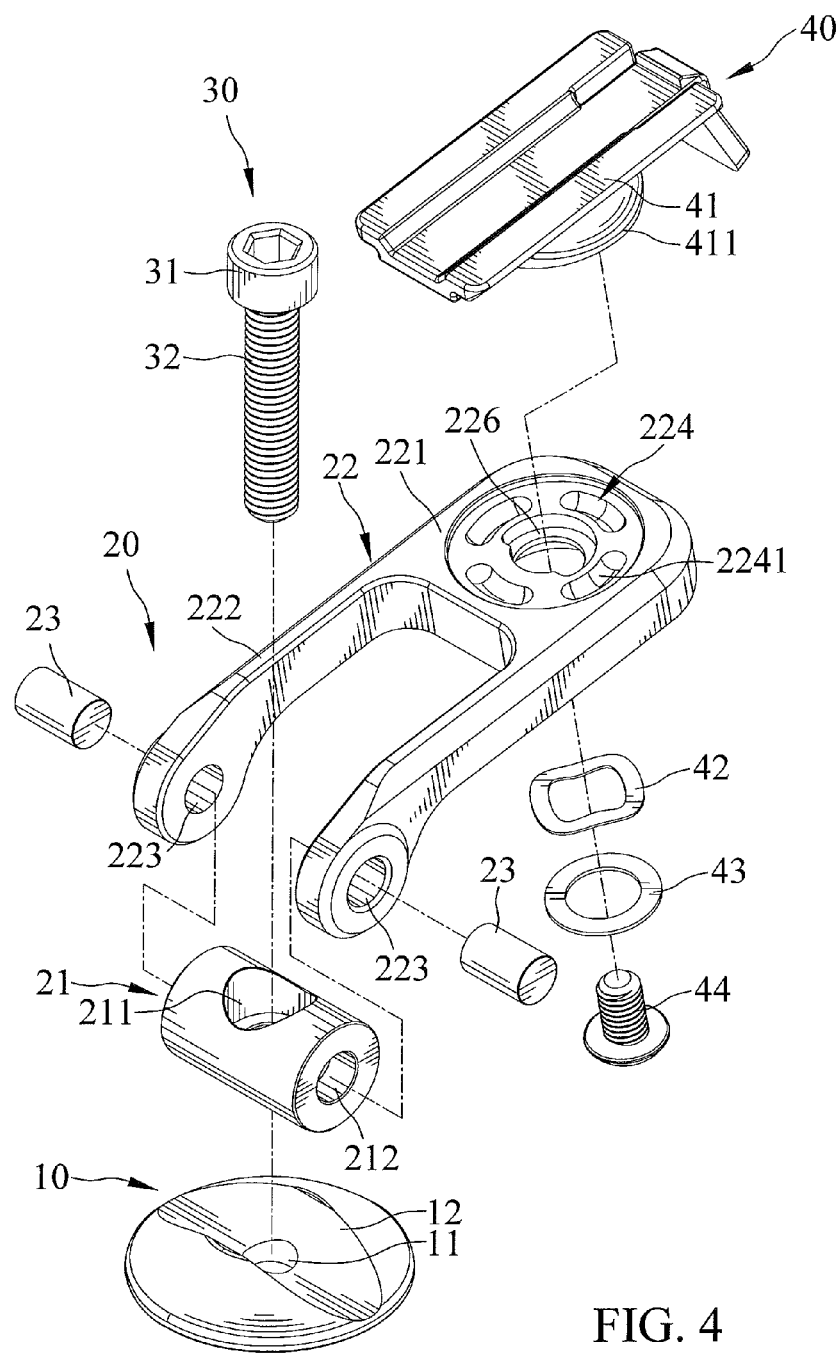
FIG. 4 is an exploded perspective view of the cap of FIG. 3.
Figure 5:
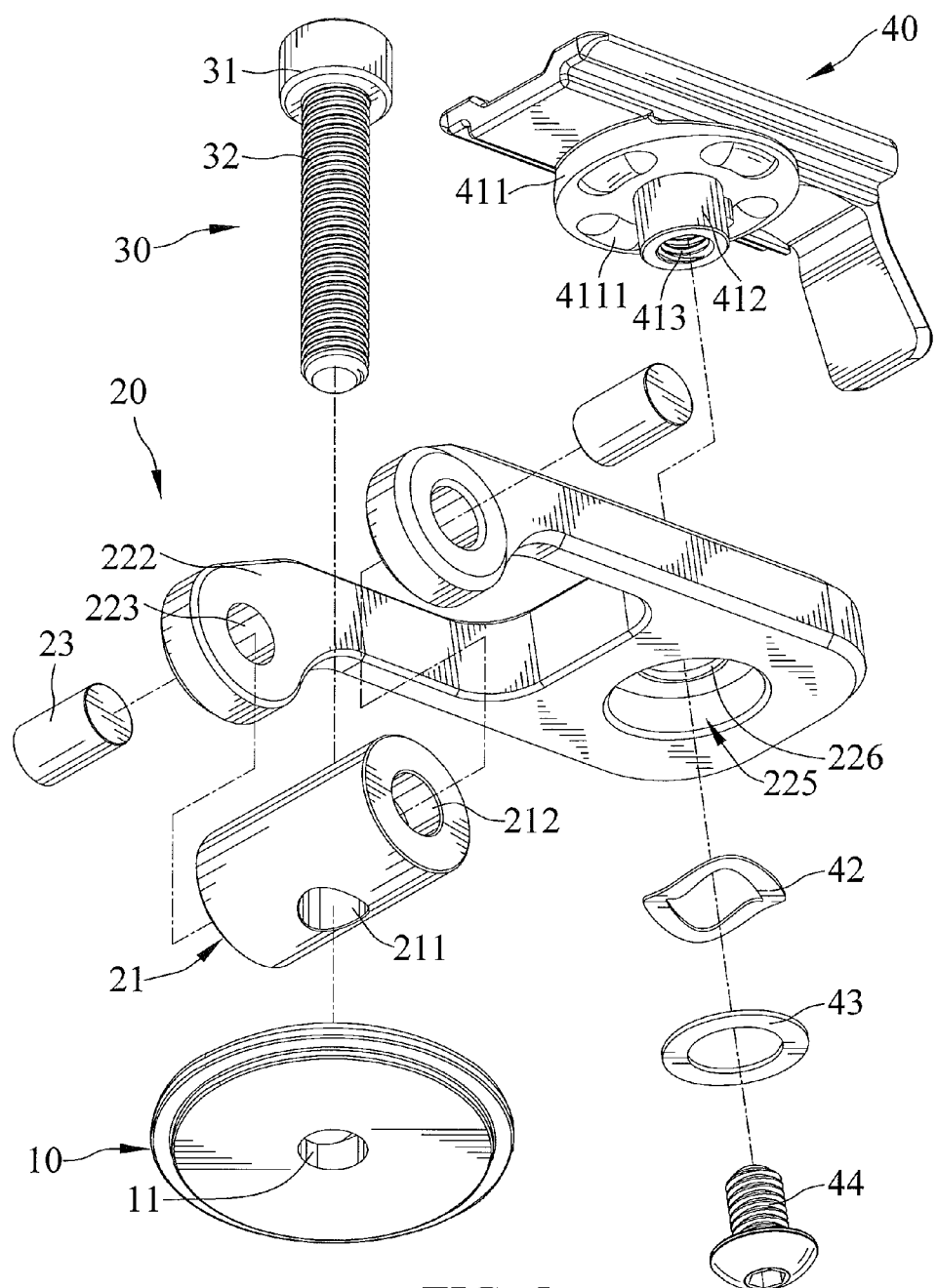
FIG. 5 is another exploded perspective view of the cap, taken at a different angle of view from FIG. 3.
Figure 6:
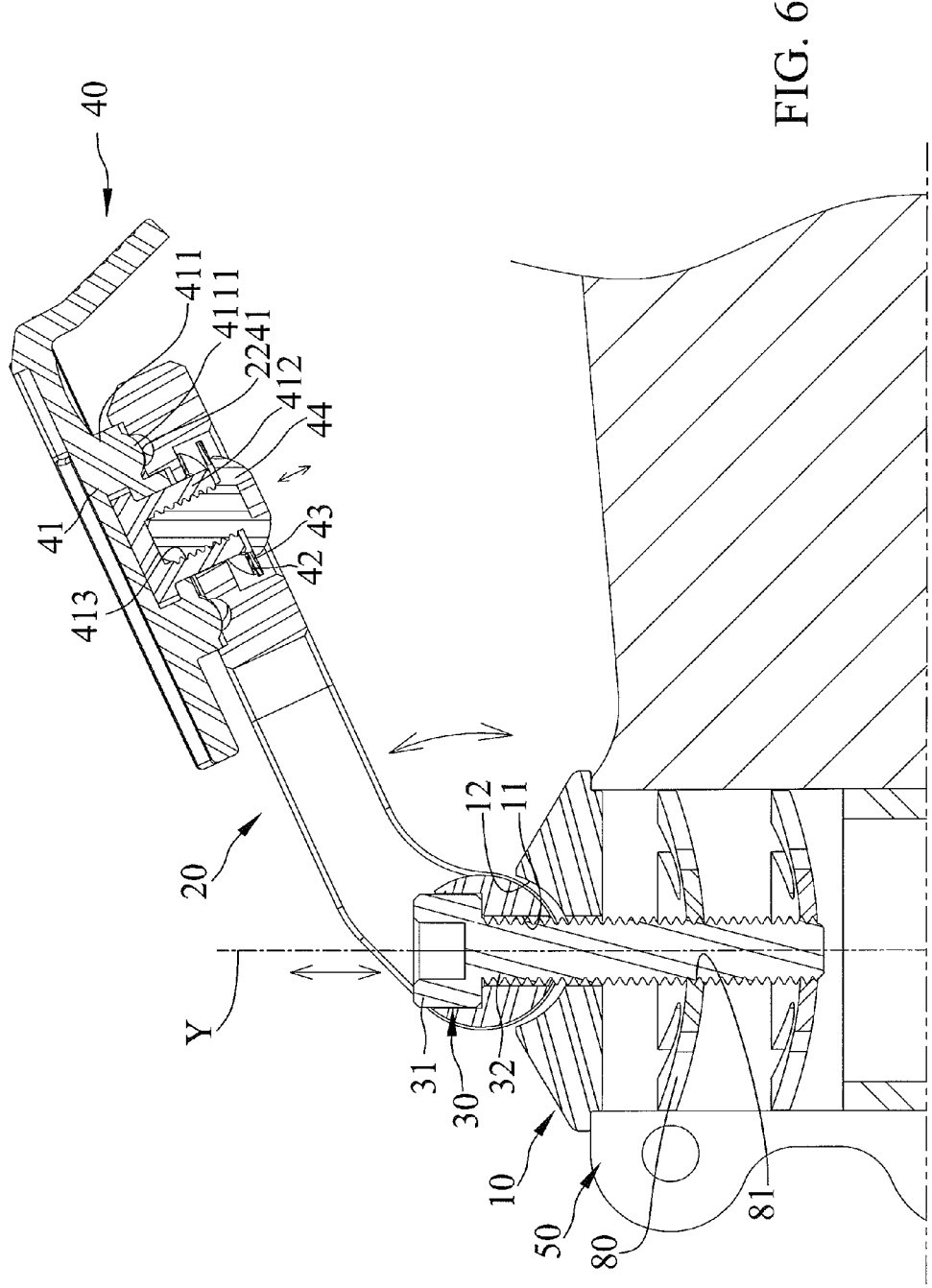
FIG. 6 is a cross-sectional view of the cap of FIG. 3 and shows the mounting bracket at a position that is allowed to be adjustably moved.

FIGS. 3 through 7 show a cap of a bicycle headset with an easy adjustable mounting bracket in accordance with the present invention includes a cap 10, a mounting bracket 20, a fastener 30, and a joining structure 40.

The cap 10 includes a hole 11 extended therethrough. The cap 10 further includes a recess 12 extended thereon. The hole 11 including an opening disposed in the recess 12. The recess 12 has an arcuate cross section.

The mounting bracket 20 is used for engaging with an accessory. The accessory can be a light, a computing device, a mobile phone, an audio device, but not limited thereto. The mounting bracket 20 is pivotally engaged with the cap 10. The mounting bracket 20 includes a pivot 21 and a bracket 22. The pivot 21 is disposed on the cap 10. The pivot 21 includes an orifice 211 extended therethrough. The orifice 211 includes a first section having a first diametrical size and a second section having a second diameter size. The first and second diametrical sizes are different from each other. The pivot 21 further includes a receptacle 212. The bracket 22 is pivotally engaged with the pivot 21 and pivotal about the pivot 21. The bracket 22 defines a connecting end 221. The connecting end 221 includes a first cavity 224, a second cavity 225, and a channel 226. The first and second cavities 224 and 225 include the channel 226 extended therebetween such that the first and second cavities 224 and 225 are interconnected by the channel 226. The bracket 22 includes at least one arm 222. The at least one arm 222 includes an engaging end pivotally engaged with the pivot 21. The engaging end has an arcuate cross section. The at least one arm includes an aperture 223. The at least one arm 222 and the pivot 21 including at least one axle 23 engaged therewith. The at least one axle 23 includes a first end engaged in the receptacle 212 and a second end engaged in the aperture 223. The at least one axle 23 is extended in a first axis direction X. In the embodiment, the at least one arm 222 includes two arms 222 and two axles 23. The two arms 222 are separated by a gap, and the pivot 21 is disposed in the gap.

The fastener 30 is inserted into the orifice 211 and the hole 11 and engagable with a star nut 80 of the bicycle headset.

The joining structure 40 is disposed on the bracket 20. The joining structure provides a joining end with which the accessory is engagable. The joining structure 40 is extended from the connecting end 221 of the bracket 22. The joining structure 40 is pivotal to various fixed pivoting positions with respect to the bracket 22. The joining structure 40 is in the pivoting position that is extended at right angles to the bracket 22. The joining structure 40 includes a platform 41 used as the joining end. The joining structure 40 pivoted to different pivoting positions causes the platform 41 oriented in different directions. The platform 41 defines first fixing and second fixing sections 411 and 412. The platform 41 includes a hollow 413. The first fixing section 411 is received in the first cavity 224. The second fixing section 412 is inserted in the hollow 413. The hollow 413 is extended in the second fixing section 412. The hollow 413 includes a fixing member 44 engaged therein. The fixing member 44 is movable between a first position in which the joining structure 40 is fixedly positioned at one of the various pivoting positions with respect to the bracket 22 and a second position in which the joining structure 40 is pivotal with respect to the bracket 22. The hollow 413 is in thread engagement with the fixing member 44. Further, a resilient member 42 and a washer 43 are disposed in the second cavity 225. The resilient member 42 is a wave spring. The fixing member 44 is inserted through the resilient member 42 and the washer 43.

Furthermore, one of the connecting end 221 of the bracket 22 and the first fixing section 411 of the platform 41 includes a first positioning section 2241, and the other of the connecting end 221 of the bracket 22 and the first fixing section 411 of the platform 41 includes a second positioning section 4111. The first cavity 224 defines a first surface and includes the first positioning section 2241 including a plurality of depressions extended in the first surface. The first fixing section 411 defines a second surface and includes the second positioning section 4111 including a plurality of protrusions extended outwardly from the second surface. The joining structure 40 positioned fixedly with respect to the bracket 22 includes the first positioning section 2241 engaged in the second positioning section 4111. The joining structure 40 moved with respect to the bracket 22 includes the first positioning section 2241 disengaged from the second positioning section 4111.

The bicycle headset engaged in a steer tube 70 includes the fastener 30 positionable between a first engaging position in which the cap 10 is rotatable about the fastener 30 and the pivot 21 is not tightly disposed in the recess 12 and the bracket 20 is pivotal to various pivoting positions with respect to the cap 10 and a second engaging position in which the cap 10 is fixedly positioned on the steer tube 70 and the pivot 21 is tightly disposed in the recess 12 and the bracket 22 is fixedly positioned at one of the pivoting positions.

The fastener 30 at the first engaging position includes the pivot 21 and the engaging end of the at least one aim 222 movably received in the recess 12 and includes the mounting bracket 20 pivotal with respect to the cap 10 about the first axis direction X. Additionally, the fastener 30 is extended in a second axis direction Y. The cap 10 is rotatable about the second axis direction Y.

The fastener 30 at the second engaging position includes the pivot 21 and the engaging end of the at least one arm 222 disposed fixedly received in the recess 12 and tightly abutting against the cap 10.

Moreover, the fastener 30 includes a head 31 and a body 32. The head 31 is engagable with a tool that is adapted to drive the fastener 30 and to facilitate a change of the fastener 30 between the first and second engaging positions. The body 32 defines an engaging section engagable with the star nut 80. The star nut 80 includes a through hole 81. The fastener 30 engaged with the star nut 80 includes the engaging section of the body 32 inserted in the through hole 81. The fastener 30 is in thread engagement with the star nut 80. Also, the fastener 30 at the second engaging position includes the head 31 fixedly received in the first section and the body 32 fixedly received in the second section of the orifice 211 respectively. The head 31 has a third diametrical size. The third diametrical size is greater than the second diametrical size.

Additionally, the steer tube 70 includes a stem 50 engaged therewith. The stem 50 defines a mounting end 51 engaged with the steer tube 70. The stem 50 engaged with the steer tube 70 includes the mounting end 501 including an inner periphery circumscribing an outer periphery of the steer tube 70. Additionally, a handle bar 60 is installed to the stem 50.

While the specific embodiment has been illustrated and described, numerous modifications come to mind without significantly departing from the spirit of invention, and the scope of invention is only limited by the scope of the accompanying claims.

What is claimed is:

1. A cap of a bicycle headset with an easy adjustable mounting bracket, with the mounting bracket used for engaging with an accessory comprising:

a cap including a hole and a recess;

a mounting bracket pivotally engaged with the cap and including a pivot and a bracket, with the pivot disposed in the recess of the cap and including an orifice, with the bracket pivotally engaged with the pivot and pivotal about the pivot;

a fastener inserted into the orifice and the hole and engagable with a star nut of a bicycle headset; and a joining structure disposed on the bracket, with the joining structure providing a joining end with which an accessory is engagable;

wherein the bicycle headset engaged in a steer tube includes the fastener positionable between a first engaging position in which the cap is rotatable about the fastener and the pivot is not tightly disposed in the recess and the bracket is pivotal to various pivoting positions with respect to the cap and a second engaging position in which the cap is fixedly positioned on the steer tube and the pivot is tightly disposed in the recess and the bracket is fixedly positioned at one of the pivoting positions.

2. The cap of a bicycle headset with an easy adjustable mounting bracket as claimed in claim 1, wherein the hole includes an opening disposed in the recess.

3. The cap of a bicycle headset with an easy adjustable mounting bracket as claimed in claim 2, wherein the bracket includes at least one arm, with the at least one arm including an engaging end pivotally engaged with the pivot, wherein the fastener at the first engaging position includes the pivot and the engaging end of the at least one arm movably received in the recess, wherein the fastener at the second engaging position includes the pivot and the engaging end of the at least one arm disposed fixedly received in the recess and tightly abutting against the cap.

4. The cap of a bicycle headset with an easy adjustable mounting bracket as claimed in claim 3, wherein the pivot includes a receptacle and the at least one arm includes an aperture respectively, with the at least one arm and the pivot including at least one axle engaged therewith, with the at least one axle including a first end engaged in the receptacle and a second end engaged in the aperture.

5. The cap of a bicycle headset with an easy adjustable mounting bracket as claimed in claim 1, wherein the bracket defines a connecting end, wherein the joining structure is extended from the connecting end, wherein the joining structure is pivotal to various fixed pivoting positions with respect to the bracket.

6. The cap of a bicycle headset with an easy adjustable mounting bracket as claimed in claim 5, wherein the connecting end of the bracket includes a first cavity, a second cavity, and a channel, with the first and second cavities including the channel extended therebetween such that the first and second cavities are interconnected by the channel, wherein the joining structure includes a platform used as the joining end, with the joining structure pivoted to different pivoting positions causing the platform oriented in different directions, with the platform defining first fixing and second fixing sections and including a hollow, with the first fixing section received in the first cavity, with the second fixing section inserted in the hollow, with the hollow extended in the second fixing section, with the hollow including a fixing member engaged therein, with the fixing member movable between a first position in which the joining structure is fixedly positioned at one of the various pivoting positions with respect to the bracket and a second position in which the joining structure is pivotal with respect to the bracket.

7. The cap of a bicycle headset with an easy adjustable mounting bracket as claimed in claim 6, wherein the hollow is in thread engagement with the fixing member.

8. The cap of a bicycle headset with an easy adjustable mounting bracket as claimed in claim 6, wherein the second cavity including a resilient member and a washer disposed therein, wherein the fixing member is inserted through the resilient member and the washer.

9. The cap of a bicycle headset with an easy adjustable mounting bracket as claimed in claim 8, wherein the resilient member is a wave spring.

10. The cap of a bicycle headset with an easy adjustable mounting bracket as claimed in claim 6, wherein one of the connecting end of the bracket and the first fixing section of the platform includes a first positioning section, wherein the other of the connecting end of the bracket and the first fixing section of the platform includes a second positioning section, wherein first cavity defines a first surface and includes the first positioning section including a plurality of depressions extended in the first surface, wherein the first fixing section defines a second surface and includes the second positioning section including a plurality of protrusions extended outwardly from the second surface, wherein the joining structure positioned fixedly with respect to the bracket including the first positioning section engaged in the second positioning section, wherein the joining structure moved with respect to the bracket including the first positioning section disengaged from the second positioning section.

11. The cap of a bicycle headset with an easy adjustable mounting bracket as claimed in claim 3, wherein the recess has an arcuate cross section, wherein the engaging end of the at least one arm has an arcuate cross section.

12. The cap of a bicycle headset with an easy adjustable mounting bracket as claimed in claim 5, wherein the joining structure is in the pivoting position that is extended at right angles to the bracket.

* * * * *